United States Patent [19]

Fujibayashi

[11] Patent Number: 4,542,421
[45] Date of Patent: Sep. 17, 1985

[54] MUTING CIRCUIT IN COMBINATION WITH A TAPE RECORDER

[75] Inventor: Kenji Fujibayashi, Tokyo, Japan

[73] Assignee: Olympus Optical Co., Ltd., Tokyo, Japan

[21] Appl. No.: 381,572

[22] Filed: May 24, 1982

Related U.S. Application Data

[63] Continuation-in-part of Ser. No. 361,864, Mar. 25, 1982, which is a continuation of Ser. No. 122,608, Feb. 19, 1980, abandoned.

[30] Foreign Application Priority Data

Mar. 26, 1979 [JP] Japan .................................. 54-38923

[51] Int. Cl.$^4$ .......................... G11B 5/02; G11B 15/12
[52] U.S. Cl. ......................................... 360/67; 360/62
[58] Field of Search ............................. 360/67, 68, 62

[56] References Cited

U.S. PATENT DOCUMENTS

| | | | |
|---|---|---|---|
| 3,840,820 | 10/1974 | Kawada | 330/207 |
| 4,417,165 | 11/1983 | Fujibayashi | 307/450 |

FOREIGN PATENT DOCUMENTS

| | | | |
|---|---|---|---|
| 54-141320 | 3/1979 | Japan | 455/212 |
| 54-141321 | 3/1979 | Japan | 455/212 |
| 55-5757620 | 9/1980 | Japan | 455/212 |

*Primary Examiner*—Vincent P. Canney
*Attorney, Agent, or Firm*—Frishauf, Holtz, Goodman & Woodward

[57] ABSTRACT

Tape recorder apparatus includes an amplifier section and a tape deck section which is selectively attachable to and detachable from the amplifier section. The amplifier section includes a muting circuit which is connected to an amplifier bias circuit and is adapted to be connected to a switch circuit in the tape deck section when the tape deck section is connected to the amplifier section. When the two sections are connected, the switch circuit supplies a muting release instruction to the muting circuit in the amplifier section for normal amplifying operation and, when the two sections are disconnected from one another, the muting release instruction from the switch circuit in the tape deck section is withheld from the muting circuit in the amplifier section, thus disabling the amplifying function of the amplifier section by causing a change in the bias potential supplied by the amplifier bias circuit. Accordingly, a loudspeaker which may be connected as an output load on the amplifier section will not reproduce electrical noises caused when input circuitry of the amplifier section is disconnected from a magnetic head of the tape deck section each time the tape deck section is detached from the amplifier section.

3 Claims, 14 Drawing Figures

F I G. 3
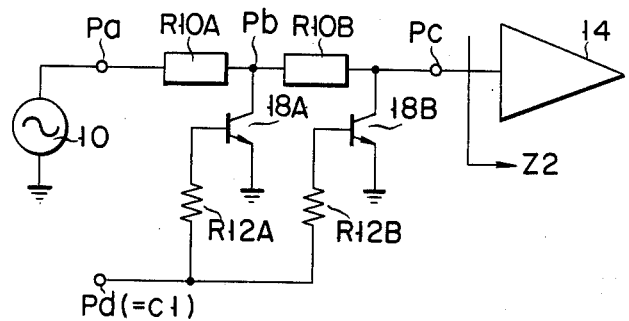
F I G. 4
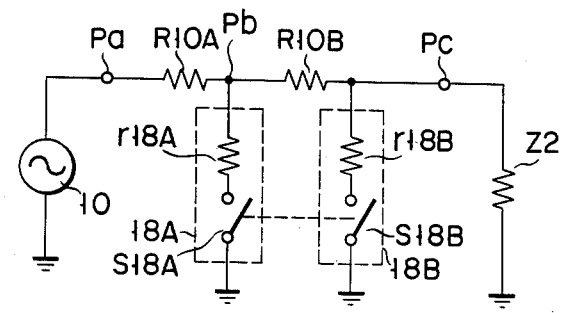
F I G. 5
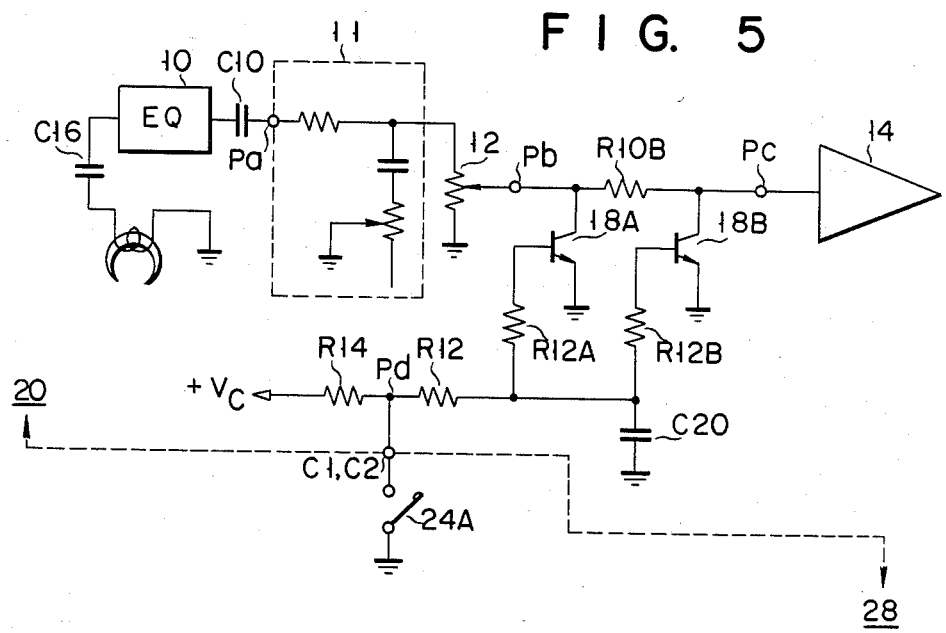

1

MUTING CIRCUIT IN COMBINATION WITH A TAPE RECORDER

CROSS-REFERENCE TO THE RELATED APPLICATION

This application is a continuation-in-part of U.S. Ser. No. 361,864, filed Mar. 25, 1982, which is a continuation of U.S. Ser. No. 122,608 filed on Feb. 19, 1980 now abandoned.

BACKGROUND OF THE INVENTION

This invention relates to a muting circuit in combination with a tape recorder which is detachably attached to an audio instrument, e.g. car stereo and home stereo apparatus.

A muting circuit is included in, for example, the reproduction or playback circuit of a tape recorder for breaking the signal transmission when desired signals are not handled. The muting circuit serves to permit transmitting musical signals, etc. only when the tape deck is set in the playback mode. If a muting circuit is not provided, a click noise is generated in switching of the playback mode. Also, noise, of the amplifier system is reproduced during the stop mode. In general, an attenuator circuit consisting of a resistor and a switching bipolar transistor connected in series with the resistor is used as a muting circuit. In the conventional muting circuit of this type, the switching transistor is rendered conductive by supplying a base current to the transistor for performing the muting function, i.e., for breaking the signals.

The conventional muting circuit described above gives rise to inconveniences when used in a tape recorder-reproducer in which the recording-reproduction amplifier system including the main portion of a muting circuit, and the tape deck system including a switching circuit serving to issue muting instructions are systematized or fabricated independently. Specifically, the muting function can not be performed if the tape deck is detached from the amplifier, resulting in that the noise of the amplifier is directly reproduced from the loudspeaker.

SUMMARY OF THE INVENTION

An object of this invention is to provide a muting circuit incorporated into an audio instrument in which a first block (either a car stereo or a home stereo) including the main body of a muting circuit, and a second block (a removably insertable or "docking" type tape deck) capable of issuing muting instructions, are systematized independently. The muting function is always performed when the first and second blocks are not coupled with each other.

According to this invention, there is provided a muting circuit, comprising a first block including an impedance element having one terminal supplied with an input signal and another terminal delivering an output signal corresponding to the input signal, at least one switching transistor having the collector and emitter thereof connected to said another terminal of the impedance element and to a circuit having an AC potential of zero volts, respectively, and a bias resistor connected between the base of the switching transistor and a DC power source serving to provide a forward bias to the switching transistor; and a second block including a switching circuit serving to decrease the base-emitter voltage of the switching transistor to a level lower than the threshold voltage of the switching transistor for rendering the switching transistor nonconductive, wherein the transfer function between said one and said another terminals of the impedance element is increased in accordance with operation of the switching circuit when the first and second blocks are coupled with each other.

The muting function is always performed when the first and second blocks are not coupled with each other without any operation for muting. When the first and second blocks have been coupled with each other, the muting function is performed in accordance with the operation mode of the second block.

BRIEF DESCRIPTION OF THE DRAWINGS

FIG. 3 is another circuit diagram of a muting circuit according to this invention;

FIG. 4 is an equivalent circuit of the muting circuit of FIG. 3;

FIG. 5 is a circuit diagram showing a part of a reproducing circuit of a tape recorder provided with the muting circuit of FIG. 3;

DETAILED DESCRIPTION OF THE PREFERRED EMBODIMENT

Figure 1:
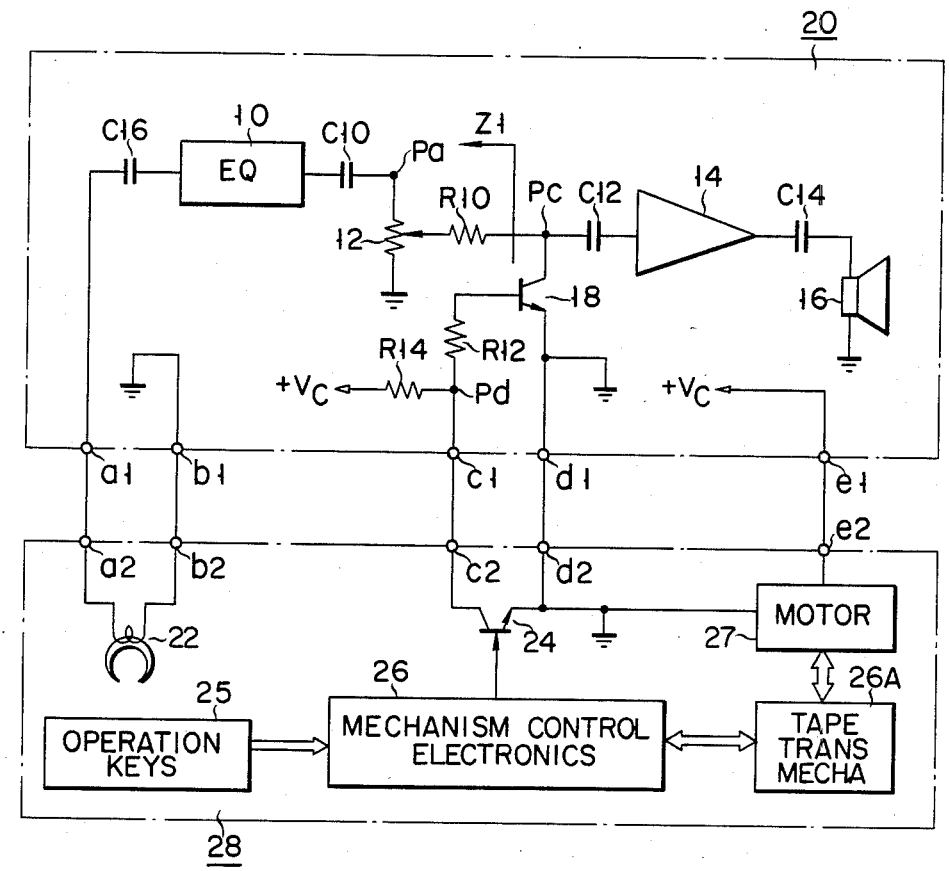
FIG. 1, shows a circuit diagram of a tape recorder system including a muting circuit of this invention.

As shown in FIG. 1, the output signal of a playback equalizer amplifier 10 is supplied to a sound volume controller 12 through a capacitor C10 and an input terminal Pa. The slider of the volume controller 12 is connected to a power amplifier 14 through a resistor R10 and a capacitor C12. The output terminal of the power amplifier 14 is connected to a loudspeaker 16 through a capacitor C14. The junction Pc between the resistor R10 and the capacitor C12 is connected to the ground through the collector-emitter path of an NPN switching transistor 18. The base of the transistor 18 is connected to a positive power source +Vc through resistors R12 and R14. It should be noted that the sum of the impedance of the resistor R10 and the impedance on the side of the volume controller 12 provides an impedance element Z1 serving to perform the muting function. The main portion of the muting circuit of this invention is formed of the impedance element Z1, the switching transistor 18 and the bias resistors R12, R14. Further, the members 10 to 18 mentioned above collectively form a first block, or an amplifier system 20.

The input terminal of the equalizer amplifier 10 is connected to a playback head 22 through a capacitor C16 and connection terminals a1, a2. Further, the junction between the bias resistors R12 and R14 is connected to the collector of an NPN transistor 24 through terminals c1, c2. The emitter of the transistor 24 is connected to ground. The transistor 24 constitutes a switching circuit serving to issue on-off instructions for the muting function. The base of the transistor 24 is connected to mechanism control electronics or logic control circuit 26. The control mode of circuit 26 is determined by operation keys 25. The logic control circuit 26 serves to control a tape transport mechanism 26A of a tape deck and supplies a base current to the transistor 24 only during, for example, the playback mode. The mechanism 26A has a motor 27 which is power supplied by the source +Vc via terminals e1 and e2. It is possible to use in this invention a conventional logic control circuit as used in a logic control type tape recorder available on the market. The transistor 24 is rendered conductive by a logic "1" signal issued from the logic control circuit 26 during the playback mode so as to stop the muting function. The members 22 to 26 described above collectively form a second block or instruction system 28. As seen from the drawing, the ground circuit of the instruction system 28 is connected to the ground circuit of the amplifier system 20 through the connection terminals b1, b2 and d1, d2.

When the amplifier system 20 is detached from the instruction system 28 a big noise is issued from the equalizer amplifier 10 because the input circuit of the equalizer amplifier 10 is open. However, it is impossible for the big noise to be reproduced from the loudspeaker 16 as explained in the following. Specifically, the switching transistor 18 is always rendered conductive when the amplifier system 20 is detached from the instruction system 28 because a forward bias is applied from the positive power source +Vc to the transistor 18 through the bias resistors R14, R12. In other words, the muting function is performed when the amplifier system 20 is detached from the instruction system 28. When the switching transistor 18 is rendered conductive, the internal impedance thereof is extremely low, resulting in a small transfer function of the voltage-dividing circuit consisting of the impedance element Z1 and the internal impedance of the transistor 18. In general, the above-mentioned transfer function ranges from −40 to −50 dB.

When the amplifier system 20 is coupled with the instruction system 28, the input circuit of the equalizer amplifier 10 is shunted by the playback head 22. In this case, unpleasant noise due to the opened input circuit of the amplifier 10 is not generated. However, the muting function should be required even after the coupling of the amplifier system 20 with the instruction system 28 in order to prevent noise generation from the loudspeaker 16 during times other than the playback mode. As described previously, the logic control circuit 26 serves to render the transistor 24 conductive during the playback mode. Where a bipolar transistor operating under such a small current region as mA order or less is used as the transistor 24, the collector-emitter saturation voltage $V_{CE(SAT)}$ of the transistor 24 is as low as 0.1 V or less. In other words, the potential difference between the connection terminals a1 and d1 is as small as 0.1 V or less. Where a silicon transistor is used as the switching transistor 18, the base-emitter threshold voltage $V_{BE}$ in turning on the transistors is about 0.5 to 0.6 V at room temperature. Therefore, the switching transistor 18 is rendered nonconductive when the transistor 24 is rendered conductive. What should be noted is that it suffices to lower the potential of the connection terminal c1 to such a level as permits rendering the transistor 18 non-conductive. It is apparent from the above description that the switching transistor 18 can be rendered conductive and nonconductive depending on the magnitude of the voltage drop across the resistor R14 caused by the current flowing out from the connection terminal c1.

The internal impedance between the collector and emitter of the switching transistor 18 in a non-conductive state can be substantially regarded as infinitely high. Thus, the muting function is not performed when the transistor 18 is rendered non-conductive. In this case, the transfer function is increased to a level determined by the voltage-dividing circuit consisting of the impedance element Z1 and the input impedance of the power amplifier 14.

Figure 2:
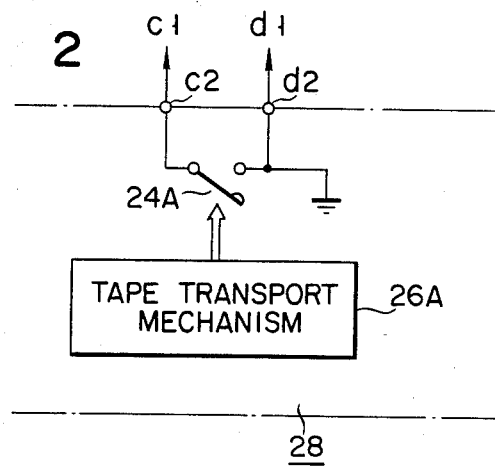
FIG. 2 shows a partial modification of the circuit shown in FIG. 1.

FIG. 2 illustrates the case where the transistor 24 shown in FIG. 1 is replaced by a switch 24A which is turned on and off in accordance with operation of a tape transport mechanism 26A. The switch 24A is turned on only when the muting function is not performed or during the tape playback mode.

In the present invention, it should be noted that the resistor R14 also acts as a load resistor of the transistor 24 and that electric power is supplied from the amplifier system 20 to the transistor 24. In other words, it is unnecessary to provide the instruction system 28 with a power source for operating the transistor 24. This implies that the muting function can be performed even when the power source of the instruction system 28 has been broken or turned off. It should also be noted that a mechanical switch (i.e. switch 24A of FIG. 2) interlocked with the playback mode of the tape deck can be used in place of the transistor 24. Further, an enhancement type MOS transistor can be used as the transistor 24.

Although specific constructions have been illustrated and described herein, it is not intended that the invention be limited to the elements and constructions disclosed. One skilled in the art will recognize that other particular elements or subconstructions may be used without departing from the scope and spirit of this invention.

Incidentally, details as to the control eletronics 26 and its peripheral circuitry are disclosed in U.S. Pat. No. 4,318,139 issued on Mar. 2, 1982 (Shibata et al). The disclosures of this USP are incorporated by reference herewith.

FIG. 3 shows an arrangement of an improved modification of a muting circuit of FIG. 1. In this circuit, an input signal generated by a signal source (equalizer amplifier) 10 is applied to one end Pa of a first impedance element R10A. The other end Pb of the first impedance element R10A is connected to one end of a second impedance element R10B. The other end Pc of the second impedance element R10B is connected to the input terminal of an amplifier 14 with input impedance Z2. The other end Pb of the first impedance element R10A is grounded by way of the collector-emitter path of an NPN-type first switch transistor 18A. Likewise, the other end Pc of the second impedance element R10B is grounded by way of the collector-emitter path of an NPN-type second switch transistor 18B. The bases of the first and second switch transistors 18A and 18B are connected to a muting signal input terminal Pd via resistors R12A and R12B, respectively. The terminal Pd corresponds to the terminal c1 of FIG. 1. When a positive DC muting signal is applied to the input terminal Pd, the transistors 18A and 18B are turned on. An output signal is derived from the other end Pc with the input signal muted or unmuted.

FIG. 4 shows an equivalent circuit of the muting circuit of FIG. 3. The signal source 10 is connected to the one end Pa which is connected to the other end Pc via the resistor R10A as the first impedance element and the resistor R10B as the second impedance element. The junction point Pb of the resistors R10A and R10B is grounded by way of a resistor r18A and a switch S18A. The resistor r18A and switch S18A correspond to the first switch transistor 18A. The resistor r18A represents the on-resistance of the first switch transistor 18A. The other end Pc is grounded by way of a resistor r18B and a switch S18B. The resistor r18B and switch S18B correspond to the second switch transistor 18B. The resistor r18B represents the on-resistance of the second switch transistor 18B. The other end Pc is grounded also by way of a resistor Z2 corresponding to the input impedance of the amplifier 14.

Supposing that there are relations $r18A = r18B = r << (R10A$ or $R10B) < Z2$, there will be described a transfer function obtained between the two ends Pa and Pc. When the switches S18A and S18B are both on, that is, during a muting operation, transfer function G1 may approximately be given by $$G1 \approx \frac{r^2}{R10A \cdot R10B} \quad (1)$$

On the other hand, when the switches S18A and S18B are both off, that is, when the circuit is off the muting operation, transfer function G2 obtained may approximately be given by $$G2 \approx \frac{Z2}{R10A + R10B + Z2} \quad (2)$$

Substituting specific values for the terms of equations (1) and (2), the effect of muting by means of the arrangement of FIG. 3 is examined. First, let it be assumed that the input impedance Z2 of the amplifier 14 is 100 K$\Omega$, R10A=R10B=10 K$\Omega$, and r18A=r18B=50 $\Omega$. This supposition is practical. From equation (1), we obtain $G1 \approx 50^2/10^8 \approx 0.25 \times 10^{-4} \approx -92$ dB. From equation (2), we obtain $G2 \approx 10^5/1.2 \times 10^5 \approx 0.83 \approx -1.6$ dB. That is, on the above assumption, the transmission loss and attenuation in the muting circuit are $-1.6$ dB and $-92$ dB, respectively.

According to the muting circuit of FIG. 3 or 4, as is evident from the above description, a small transmission loss and a high degree of muting attenuation may be provided at a time. Moreover, this effect can be obtained with use of such a simple arrangement as shown in FIG. 3. The muting circuit shown in FIG. 3 has a simple construction in harmony with a satisfactory muting effect. Namely, it can be regarded as a muting circuit with extremely high cost-performance. Further, it is noticeable that the first impedance element R10A can be replaced with an internal impedance on the signal source 10 side. Let us suppose, for example, that the signal source 10 is a reproducing equalizer amplifier 10 whose output end Pa is connected to the point Pb through a tone control circuit 11 and a volume controller 12, as shown in FIG. 5. In this case, the internal impedance of the tone control circuit 11 and volume controller 12 may be utilized for the first impedance element R10A.

In FIG. 5, the bases of the transistors 18A and 18B are biased by positive voltage +Vc through resistors R12A, R12B, R12 and R14. Accordingly, in the circuit arrangement of FIG. 5, a muting operation is performed when the junction point Pd of the resistors R12 and R14 is opened by the turning-off of a switch 24A or by disconnecting the terminal c1 from the terminal c2. The junction point of the resistors R12A, R12B and R12 is grounded by way of a capacitor C20. By the charge and discharge of the capacitor C20, the on-off switching of the muting operation by means of the switch 24A can smoothly be done.

Preferably, bipolar transistors are used for the first and second switch transistors 18A and 18B. They may, however, be replaced by FET's. When using depletion-type FET's, for example, they are cut off by a bias voltage above the pinch-off voltage while the muting operation is off. As for enhancement-type FET's, they may enjoy the same circuit arrangement with the bipolar transistors.

The muting circuit of FIG. 3 has a two-stage configuration in which the switch transistors 18A and 18B are concatenated in two stages. This two-stage configuration may, however, be developed into a three-stage configuration. By the use of the concatenation or cascade connection of three or more stages, the attenuation at the muting operation can be further increased.

Furthermore, the first and second impedance elements R10A and R10B may include reactance components. The type of these impedance elements may variously be changed according to other circuit or circuits to which the muting circuit of the invention is applied.

Figure 6:
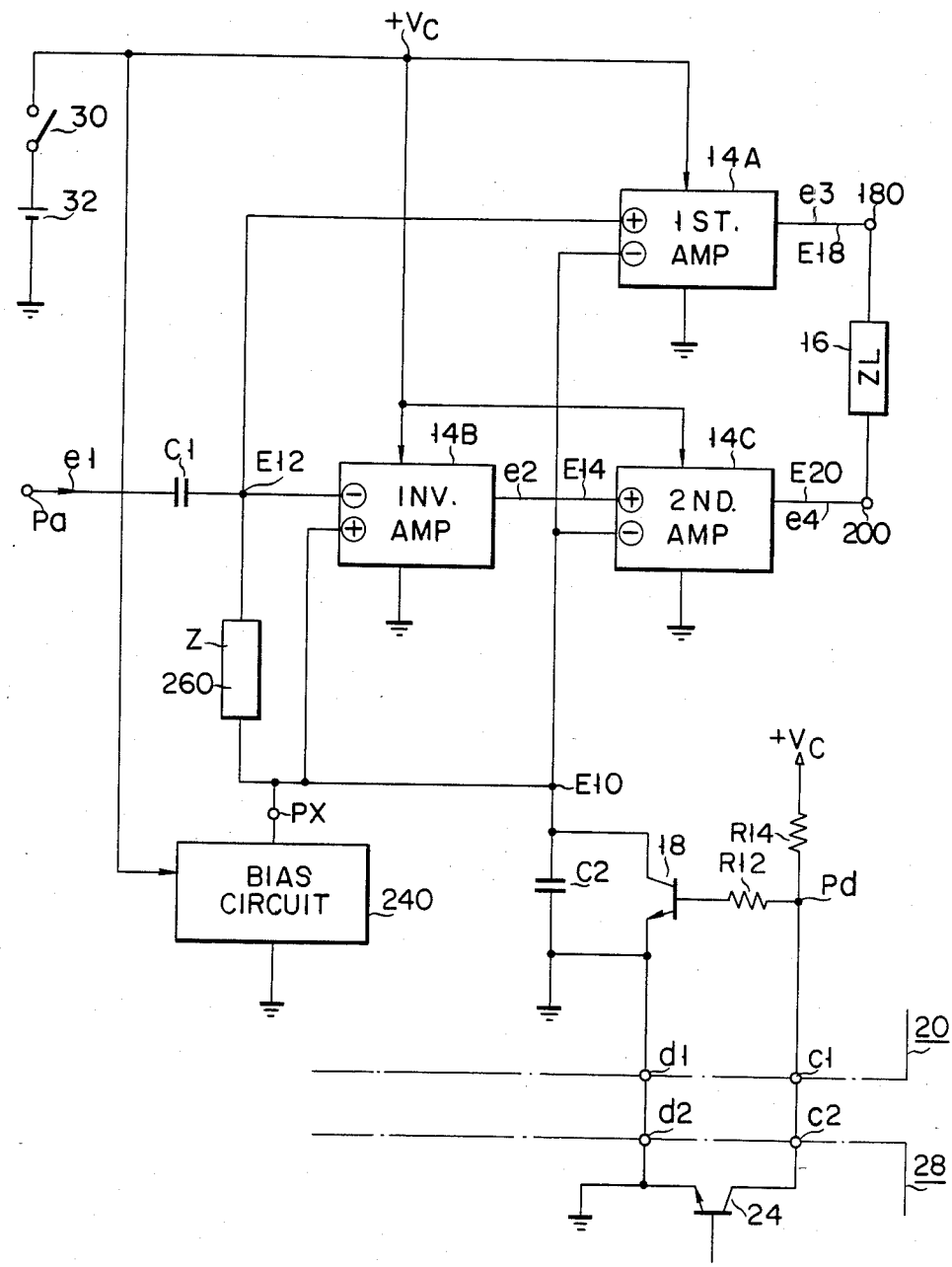
FIG. 6 is a block diagram showing another embodiment of a muting amplifier circuit according to the present invention.

FIG. 6 shows another embodiment of the invention.

In FIG. 6, an input signal e1 applied to an input terminal Pa is then applied to the non-inverted input (signal input) of a first amplifier 14A through an input capacitor C1. The signal e1 passed through the capacitor C1 is also applied to the inverted input (signal input) of an inverted amplifier 14B. The inverted amplifier 14B has an amplification factor of "1" and outputs a phase-inverted signal e2 which is opposite in phase to the signal e1. The signal e2 is applied to the non-inverted input (signal input) of a second amplifier 14C. A load 16 is connected between outputs 180 and 200 of amplifiers 14A and 14C.

To inverted inputs of amplifiers 14A and 14C and to the non-inverted input of amplifier 14B are applied a bias potential E10 from a bias terminal PX of a bias circuit 240. The potential E10 is set to be about half a power source potential +Vc which is applied to amplifiers 14A, 14B and 14C. The potential E10 is applied to signal inputs of amplifiers 14A and 14B through an impedance element 260 having a given direct-current resistance. The current supply line of bias potential E10 is coupled through the parallel circuit of a by-pass capacitor C2 and a switching transistor 18 to a circuit ground. The power source circuit of amplifiers 14A, 14B, 14C and bias circuit 240 is connected to a power source 32 through a power source switch 30. When the switch 30 is turned on, the power source potential +Vc is supplied to amplifiers 14A, 14B, 14C and circuit 240. The potential +Vc is also applied to the base of transistor 18 so that the transistor 18 is turned on unless the point Pd is grounded.

Let us consider the case where switch 30 and transistor 18 are turned off. When the switch 30 is now turned on, the bias potential E10 rises progressively from zero to ½ Vc. If the input bias current of amplifiers 14A and 14B is small enough and the direct-current resistance of element 260 is not too large, a potential E12 applied to signal inputs of amplifiers 14A and 14B is almost the same as the potential E10. Therefore, non-inverted and inverted input potentials E12 and E10 of amplifier 14A rise at the same rate. Since the potential E10 is supplied to the non-inverted input of amplifier 14B having the amplification factor of "1", the output potential E14 of amplifier 14B rises at same rate as the potential E10. Therefore, if amplifiers 14A and 14B have same circuit components, the output potential E18 of amplifier 14A and the output potential E20 of amplifier 14C carry out quite the same potential change. The potential difference (E18−E20) between terminals 180 and 200 is therefore made zero, so that no signal current corresponding to pop noise (transient noise) just after the switch 30 is turned on flows to the load 16. The same thing can be said for the case where the switch 30 is turned off. Namely, potentials E12 and E14 fall at the same rate as the potential E10 and the potential difference between terminals 180 and 200 is kept zero. Therefore, no pop noise is applied to the load 16 just after the switch 30 is turned off.

As described above, the circuit arrangement shown in FIG. 6 prevents pop noise from occurring by the turning on and off of switch 30. Similarly, the occurrence of pop noise following the turning on and off of the switching transistor 18 can also be prevented. When the switch 30 is turned on and the operation of the circuit becomes stable, potentials E12, E14, E18 and E20 become the same as the potential E10. When the transistor 18 is turned on, the potential E10 becomes zero in a short time period. Potentials E12 and E14 fall this time at the same ratio as the potential E10 and potentials E18 and E20 carry out the same potential change. Therefore, the potential difference between terminals 180 and 200 is kept zero, thus causing no pop noise. When the transistor 18 is turned on, all of amplifiers 14A, 14B and 14C are cut off and left under a muting condition. Amplifiers 14A, 14B and 14C consume little power under this muting condition. Therefore, when the power source 32 is a battery, the battery is not wasted. When the transistor 18 is turned off, the bias potential E10 rises progressively. The behavior in this case may be considered the same as the case where the switch 30 is turned on. Namely, potentials E18 and E20 change at the same rate, thus causing no pop noise.

The muting circuit shown in FIG. 6 is superior to conventional ones, which serve only to turn on and off the voice signal line, in that the battery 32 is wasted less during the muting operation. In addition, no pop noise is caused following the muting operation.

When the power source switch 30 is turned on and the switching transistor 18 off, a first output signal e3 which has the same phase as that of input signal e1 is obtained from the amplifier 14A, and a second output signal which has a phase reverse to that of input signal e1 is obtained from the amplifier 14C. The difference of signals e3 and e4 is applied to the load 22 as an output signal corresponding to the input signal e1.

Figure 7:
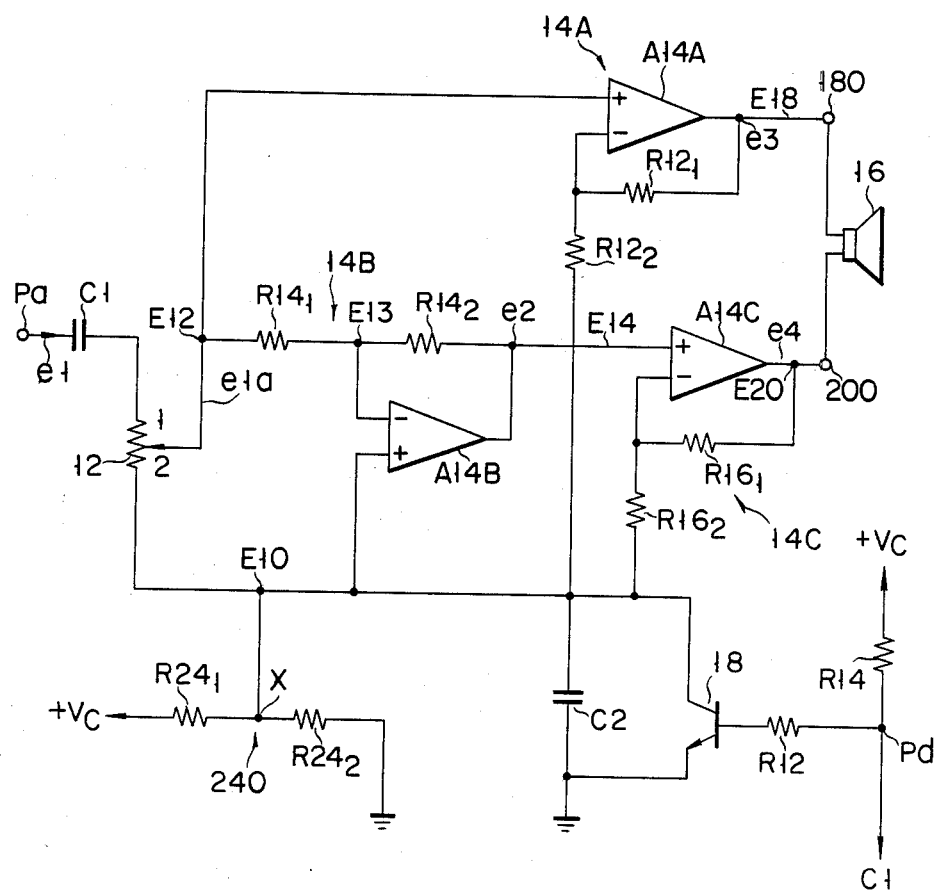
FIG. 7 is a circuit diagram showing the material portion of FIG. 6.

FIG. 7 shows a detailed circuit configuration of FIG. 6.

An input signal e1 is applied to the first terminal of a variable resistor 12 via a capacitor C1. The second terminal of variable resistor 12 is connected to the connection point X between resistors $R24_1$ and $R24_2$. A bias potential E10 is obtained from the connection point X. To the other end of resistor $R24_1$ is applied a power source potential +Vc while the other end of resistor $R24_2$ is grounded. A signal e1a which is similar to the signal e1 is applied from the slider of variable resistor 12 to the non-inverted input of an amplifier A14A. The output of amplifier A14A is coupled to a first output terminal 180 and to its inverted input via a resistor $R12_1$. The inverted input of amplifier A14A is connected to the connection point X via a resistor $R12_2$.

The signal e1a is applied via a resistor $R14_1$ to the inverted input of an amplifier A14B. The output of amplifier A14B is connected to its inverted input via a resistor $R14_2$. The non-inverted input of amplifier A14B is connected to the connection point X. An inverted signal e2 is supplied from the amplifier A14B to the non-inverted input of an amplifier A14C. The output of amplifier A14C is connected to a second output terminal 200 and to its inverted input via a resistor $R16_1$. The inverted input of amplifier A14C is connected to the connection point X via a resistor $R16_2$. A speaker 16 is connected as a load between output terminals 180 and 200. The current supply circuit relative to amplifiers A14A, A14B and A14C is omitted in FIG. 7.

It is assumed in FIG. 7 that amplifiers A14A, A14B and A14C have sufficiently high open loop gain and input impedance and sufficiently small input offset current. It is also assumed that $R14_1 = R14_2$ and $R12_1/R12_2 = R16_1/R16_2$, and that the impedance of capacitor C2 is sufficiently small in the frequency band of input signal e1. Then, the amplifier A14A forms a positive phase amplifier whose amplification factor is $(1 + R12_1/R12_2)$, and amplifiers A14B and A14C jointly form a negative phase amplifier whose amplification factor is $-(1 + R16_1/R16_2)$. Therefore, the amplifier circuit shown in FIG. 7 forms a power amplifier of BTL type relative to the signal e1. On the other hand, amplifiers A14A and A14B+A14C carry out the same phase operation relating to potential change caused following the turning on and off of power switch 30 or switching transistor 18. Namely, the change of potential E10 caused following the turning on and off of switch 30 or transistor 18 is the same as those of amplifiers A14A and A14B. Changes of potentials E12 and E14 are caused similarly following the change of potential E10. Namely, when the input offset current of amplifiers A14A and A14B is neglected, E10=E12.

The inverted input potential E13 of amplifier A14B becomes equal to E10 due to negative feedback action. This can be considered similarly to the fact that the inverted input of amplifier A14B becomes an imaginary ground when the potential appearing at the non-inverted input of amplifier A14B is considered as a reference (ground level). As described above, no current flows to resistors $R14_1$ and $R14_2$ since E10=E12=E13. Therefore, E13=E14, that is, E10=E12=E14. It results from this that potentials E12 and E14 change similarly following the change of potential E10 and that output potentials E18 and E20 also change at the same rate. Namely, the potential difference between both ends of speaker 16 is always kept zero independently of change of potential E10, and no pop noise is caused following the turning on and off of power source switch 30 or switching transistor 18.

The capacitor C2 serves to substantially make zero the AC impedance of current supply line of bias potential E10 and to smoothly achieve the muting operation. Namely, the electric charge of capacitor C2 is discharged in a short time period by the turning on of transistor 18 to stop the amplifying function at once. When the transistor 18 is then turned off, the capacitor C2 is slowly charged via a resistor $R24_1$. Therefore, no big sound is suddenly generated through the speaker 16 at the instant when the transistor 18 is turned off (or muted off).

Figure 8:
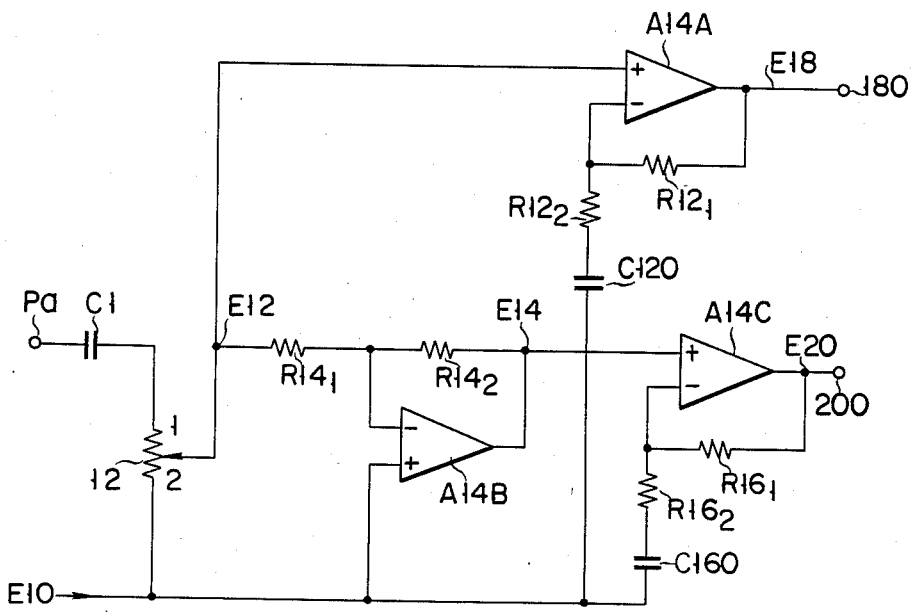
FIG. 8, is a circuit diagram showing a variation of FIG. 7.

FIG. 8 shows a modification of the circuit shown in FIG. 7. Capacitors C120 and C160 are arranged in series with resistors $R12_2$ and $R16_2$ which form a negative feedback loop. Capacitors C120 and C160 cause amplifiers A14A and A14C to achieve 100 percent negative feedback in the DC area. Therefore, DC drift at outputs 180 and 200 is smaller than that in FIG. 7. When time constants $C120 \cdot R12_2$ and $C160 \cdot R16_2$ are appropriately selected, a high-pass filter characteristic of cutting low band unnecessary to reproduce voice sounds can be obtained. When it is arranged that $R12_1 = R16_1$, $R12_2 = R16_2$ and $C120 = C160$, potentials E18 and E20 change similarly following the change of potential E10. Accordingly, even if capacitors C120 and C160 are added, no pop noise is caused.

Figure 9:
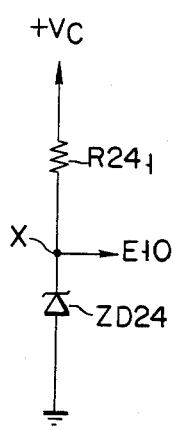
FIGS. 9 through 11 are circuit diagrams showing concrete examples of the bias circuit shown in FIG. 6.
Figure 10:
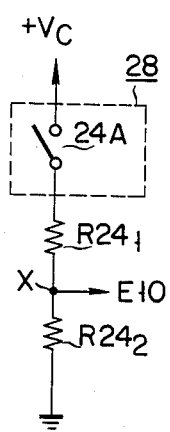
Figure 11:
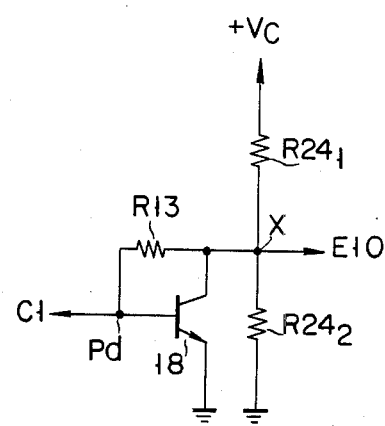

FIGS. 9 through 11 show concrete examples of the bias circuit shown in FIG. 6. A resistance voltage divider is employed as the circuit 240 in FIG. 2, but a Zener diode ZD24 is employed in FIG. 9 to form a voltage-stabilized bias circuit. The switching transistor 18 is arranged parallel to the resistor $R24_2$ in FIG. 7, but a muting switch 24A is arranged in series with a resistor $R24_1$ in FIG. 10. The switch 24A and transistor 18 operate reversely as to their ON/OFF states, but function similarly. Namely, a muting condition is established by the turning on of transistor 18 in FIG. 7 but by the turning off of switch 24A in FIG. 10. FIG. 11 shows a case where the transistor 18 in FIG. 7 is biased via a resistor R13 connected between the collector and base thereof. The connection point X between resistors $R24_1$ and $R24_2$ is grounded through the collector-emitter path of transistor 18. The transistor 18 is turned on and falls under a muting condition when the point Pd is not grounded. When the point Pd is grounded the muting condition is released. The resistor R24 shown in FIGS. 7 through 11 may be replaced by an element having a constant current characteristic which appears, for instance, between drain and source of a junction FET.

If potentials E18 and E20 change similarly following the change of potential E10 in FIG. 6, for example, the circuit arrangement of first amplifier 14A may be different from that of second amplifier 14C. Inverted amplifier 14B and second amplifier 14C may be regarded as a single inverted amplifier (14B+14C). The amplifier circuit according to the present invention can be applied to a circuit of positive and negative two power source type. The input capacitor C1 can be omitted in this case.

Figure 12:
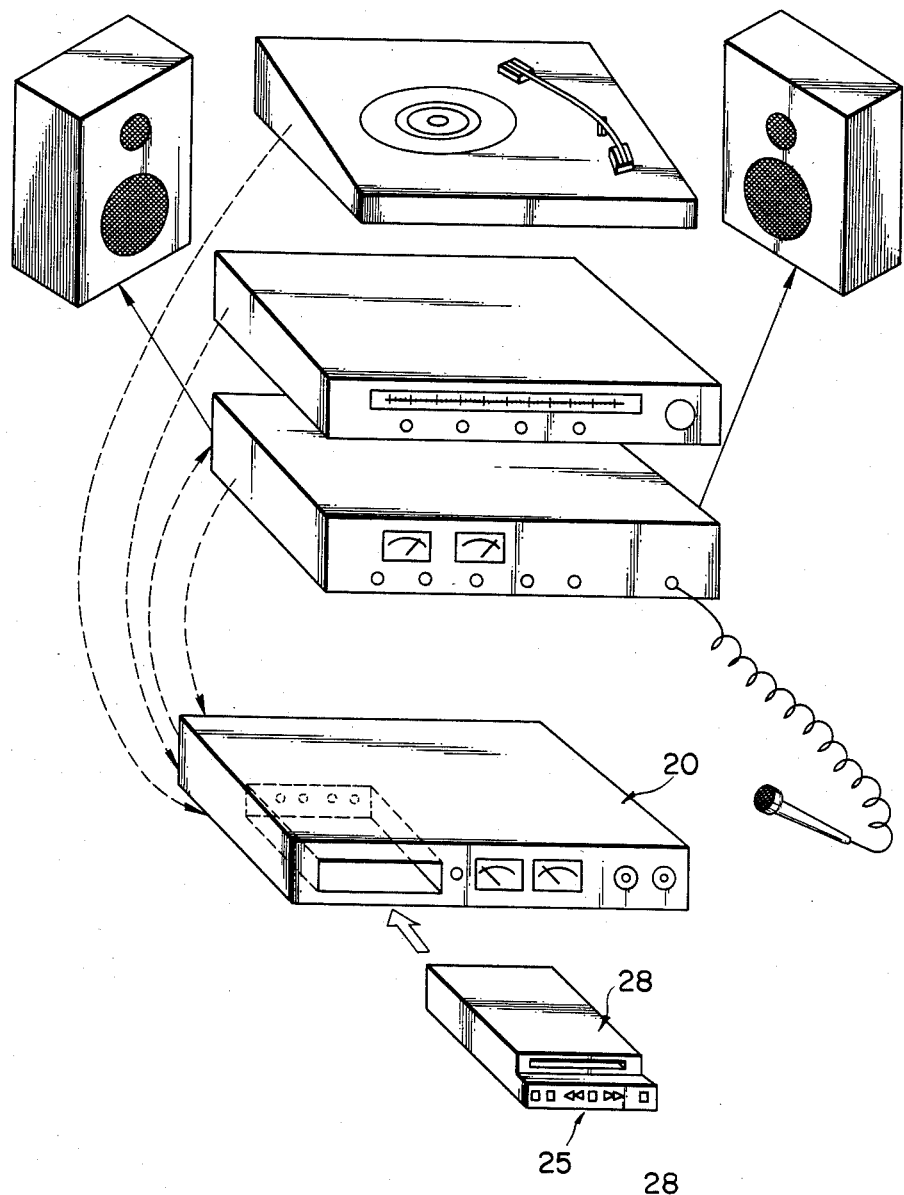
FIG. 12 is a perspective view showing a home unit (first block) 20 and a docking unit (second block) 28 wherein the unit 28 is detached from the unit 20.
Figure 13:
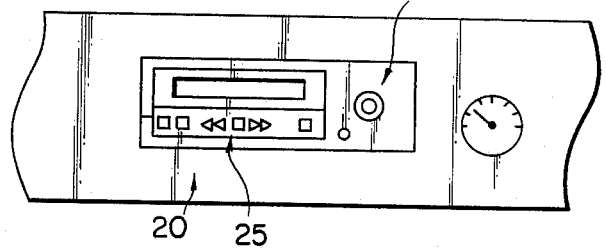
FIG. 13 is a front view of a car stereo unit (first block) 20 and a docking unit 28 wherein the unit 28 is docked with the unit 20.
Figure 14:
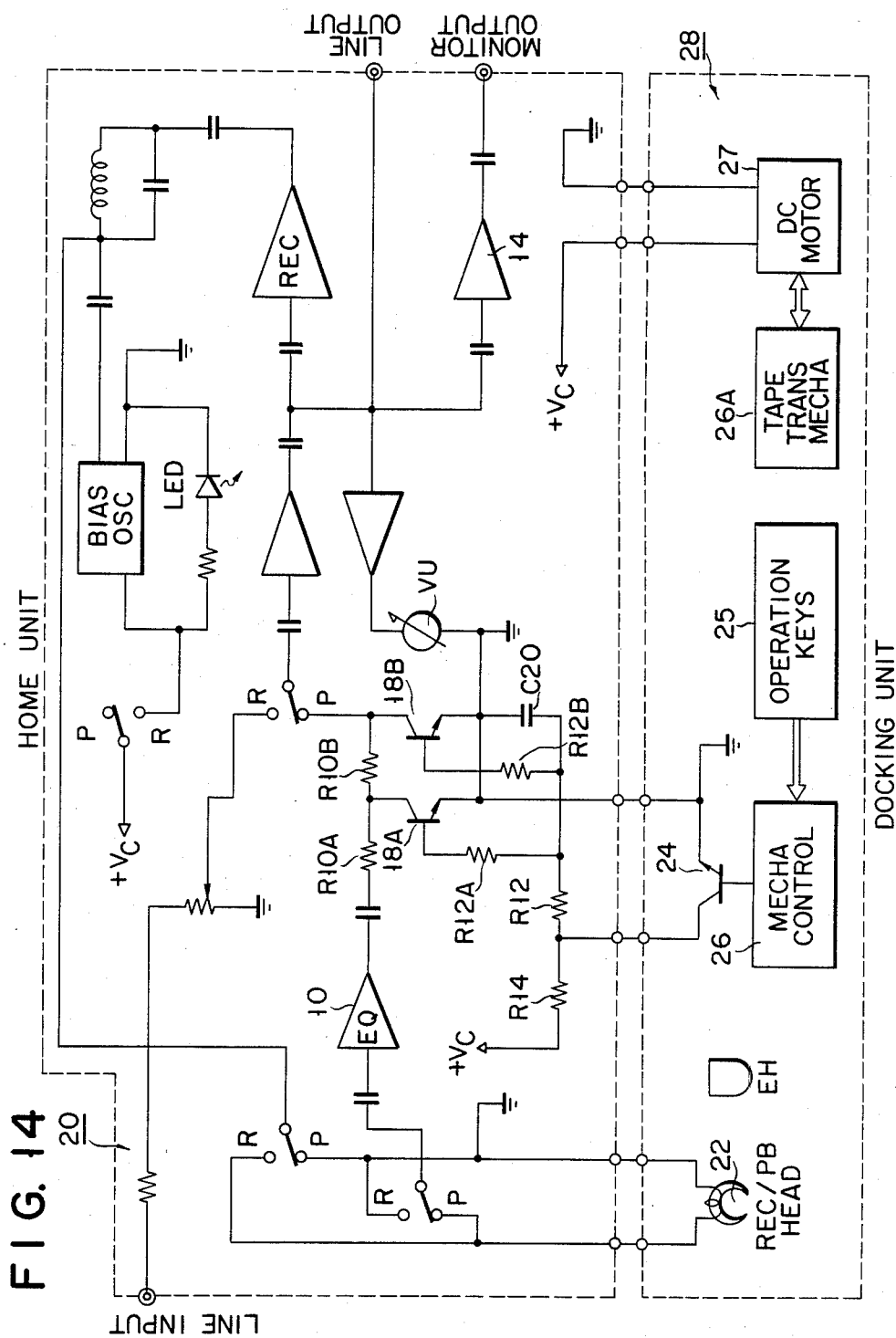
FIG. 14 is a circuit diagram of units 20 and 28 shown in FIG. 12.

FIG. 12 shows a first block 20 which is used as a home stereo unit and a second block 28 which forms a docking unit or a tape deck unit. FIG. 13 shows another first block 20 which is used as a car stereo unit and the second block or tape deck unit 28. FIG. 14 shows the circuitry of units 20 and 28. The unit 28 is commonly adopted to both home stereo unit 20 (FIG. 12) and car stereo unit 20 (FIG. 13). The unit 20 of FIGS. 12 or 13 is not a portable one. When unit 28 is detached from unit 20 (FIGS. 12 or 13), unit 20 is always muted without any muting operation. Where unit 28 is connected to or docked with unit 20 (FIGS. 12 or 13), then unit 20 is muted or unmuted according to the operation of unit 28. For instance, where tape deck unit 28 is connected to home unit 28, then the playback (reproduce) amplifier circuit is unmuted only when the operation keys 25 instruct the PLAY mode. When unit 28 is disconnected from unit 20, the playback circuit is always muted even if the keys 25 instruct the PLAY mode. Thus, any uncomfortable noise is never reproduced when the units 20 and 28 are separated. By so doing, the material part of the muting circuit may be only one which is provided in the unit 20. This makes the configuration of the muting circuit simple and concise.

What is claimed is:
1. A tape recorder apparatus, comprising:
an amplifier section having a muting function and a tape deck section including a magnetic head and a switch circuit for supplying a muting release instruction in accordance with an operation mode of said tape deck section, wherein said tape deck section is selectively connectable to and detachable from said amplifier section,
said amplifier section comprising:
equalizer means including an input circuit adapted to be connectable to said magnetic head for providing an equalized output corresponding to an output from said magnetic head when said tape deck section is connected to said amplifier section;
first amplifier means connected to said equalizer means for amplifying, with a given bias potential, said equalized output and for providing a first output;
second amplifier means connected to said equalizer means for amplifying, with said given bias potential, said equalized output and for providing a second output which is inverted relative to said first output, and terminal means for applying the potential difference between said first output and said second output to an output load of said first and said second amplifier means;
bias means for supplying said given bias potential to said first and said second amplifier means, said given bias potential serving to enable the amplifying function of said first and said second amplifier means; and
muting means, coupled to said bias means and adapted to be connectable to said switch circuit, for changing said given bias potential in the absence of said muting release instruction, so that the amplifying function of said first and said second amplifier means is disabled,
wherein said muting release instruction is withheld from said muting means when said tape deck section is detached from said amplifier section so that an output load coupled to said terminal means is free from noises produced in said equalized output of said equalizer means when the input circuit of said equalizer means is disconnected from said magnetic head each time said tape deck section is detached from said amplifier section.

2. The apparatus of claim 1, wherein said muting means of said amplifier section includes a switch transistor whose collector is coupled to said given bias potential supplied by said bias means, whose emitter is circuit-grounded and whose base is connected to receive said muting release instruction, and said switch transistor is turned OFF when said muting release instruction is supplied in accordance with said operation mode, so that said first and said second amplifier means are enabled to amplify said equalized output.

3. The apparatus of claim 2, wherein said switch circuit of said tape deck section includes a switch element adapted to be coupled between the base circuit of said switch transistor and the circuit-ground when said tape deck section is connected to said amplifier section, said switch element being turned ON when said muting release instruction is to be supplied in accordance with said operation mode, so that said first and said second amplifier means are enabled to amplify said equalized output.

* * * * *

UNITED STATES PATENT AND TRADEMARK OFFICE
CERTIFICATE OF CORRECTION

PATENT NO. : 4,542,421
DATED : September 17, 1985
INVENTOR(S) : Kenji FUJIBAYASHI It is certified that error appears in the above-identified patent and that said Letters Patent is hereby corrected as shown below:

Initial page of patent, under the heading of "Related U.S. Application Data," after "Serial No. 361,864, Mar. 25, 1982," insert --abandoned--;

Initial page of patent, under the heading of "Foreign Application Priority Data," the prior Japanese application umber should read --54-38923[U]--;

Column 3, line 65, change "al" to --cl--;
Column 3, last line, change "transitors" to --transistors--;
Column 9, line 21, after "band" insert --components--.

Signed and Sealed this

Eleventh Day of March 1986

[SEAL]

Attest:

DONALD J. QUIGG

Attesting Officer

Commissioner of Patents and Trademarks